United States Patent
Krach et al.

(10) Patent No.: US 10,711,666 B1
(45) Date of Patent: Jul. 14, 2020

(54) METHODS AND SYSTEMS FOR CYLINDER VALVE DEACTIVATION

(71) Applicant: Ford Global Technologies, LLC, Dearborn, MI (US)

(72) Inventors: Adam Krach, Canton, MI (US); John Rollinger, Troy, MI (US); Rob Ciarrocchi, Stockbridge, MI (US); Adam Richards, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/391,198

(22) Filed: Apr. 22, 2019

(51) Int. Cl.
| | | |
|---|---|---|
| *F01L 13/00* | (2006.01) | |
| *F02M 51/06* | (2006.01) | |
| *F01L 1/04* | (2006.01) | |
| *F02D 41/02* | (2006.01) | |
| *F02D 41/00* | (2006.01) | |

(52) U.S. Cl.
CPC .............. *F01L 13/0042* (2013.01); *F01L 1/04* (2013.01); *F02D 41/02* (2013.01); *F02M 51/0664* (2013.01); *F01L 2013/001* (2013.01); *F01L 2820/03* (2013.01); *F02D 2041/0012* (2013.01)

(58) Field of Classification Search
CPC ....... F01L 2001/0473; F01L 2001/0535; F01L 2009/0401; F01L 2009/0473; F01L 2009/0478; F01L 13/0005; F01L 2013/001; F01L 2013/0052; F01L 2013/101; F01L 2013/116; F01L 2201/00; F01L 2820/031; F01L 2820/044; F02D 13/06; F02D 35/0007; F02D 2041/0012; F02D 41/0087; F02D 2041/2027; F02D 2041/2048; F02D 2041/2062; F02D 2200/021
USPC .................................. 123/90.18, 481, 198 F
See application file for complete search history.

(56) References Cited

U.S. PATENT DOCUMENTS

| | | |
|---|---|---|
| 4,855,913 A | 8/1989 | Brekkestran et al. |
| 7,099,136 B2 | 8/2006 | Seale et al. |
| 9,657,611 B2 | 5/2017 | Doering et al. |
| 2005/0205027 A1* | 9/2005 | Lewis ................ F01L 9/04 123/90.11 |

FOREIGN PATENT DOCUMENTS

JP          2011141019 A       7/2011

\* cited by examiner

*Primary Examiner* — Jorge L Leon, Jr.
(74) *Attorney, Agent, or Firm* — Geoffrey Brumbaugh; McCoy Russell LLP

(57) ABSTRACT

Methods and systems are provided for monitoring and controlling a cylinder valve deactivation mechanism. In one example, a method may include sending a lower command signal to a cylinder deactivation valve control (CDVC) system without actuating a cylinder valve transition, determining an impedance of a solenoid of the CDVC system while sending the lower command signal, and actuating the cylinder valve transition responsive to the determined impedance by sending a higher command signal to the CDVC system. In this way, the cylinder valve transition is performed when the impedance is high enough to prevent over-current.

20 Claims, 7 Drawing Sheets

METHODS AND SYSTEMS FOR CYLINDER VALVE DEACTIVATION

FIELD

The present description relates generally to methods and systems for controlling cylinder valve deactivation in a variable displacement engine.

BACKGROUND/SUMMARY

Variable displacement engine (VDE) designs can provide increased fuel efficiency by deactivating cylinders during operational modes with decreased engine output. Such designs may incorporate cylinder deactivation valve control (CDVC) hardware for deactivating the cylinders. As one example, the CDVC hardware may include a cam profile switching (CPS) system that uses a solenoid actuated by a current driver to switch to a no-lift cam profile for deactivating cylinder intake and exhaust valves, and thus the corresponding cylinder. However, a current drawn by the CDVC solenoid is a function of solenoid impedance, which is a function of solenoid temperature. At lower solenoid temperatures, the effective solenoid impedance may be so low that the potential current drawn by the solenoid is greater than a capability of the current driver, which may cause current driver degradation. Therefore, the CDVC hardware may not be actuated during conditions when the solenoid temperature is expected to be low, such as during an engine cold start. For example, a control system may model the solenoid impedance to estimate when CDVC solenoid actuation is enabled, with a conservative bias to avoid over-current. As another example, the control system may use a timer to prevent CDVC solenoid actuation until the engine has been on for a predetermined duration to ensure that the CDVC solenoid has been warmed through engine operation. As a result, CDVC solenoid actuation may be delayed.

Other attempts to reduce CDVC solenoid actuation time include operating the solenoid at a low level prior to the actuation. One example approach is shown by Doering et al. in U.S. Pat. No. 9,657,611 B2. Therein, the solenoid is operated at a lower pre-charge or pre-activation level in response to an increased potential for a valve transition (e.g., due to an expected transition into or out of a VDE operating region). Then, in response to the transition to the VDE operating region, the level is increased to a maximum level to quickly actuate the solenoid for the valve transition.

However, the inventors herein have recognized potential issues with such systems. As one example, expediting valve transitions while the engine is cold is not addressed, as the increased potential for the valve transition includes operating with an engine temperature above a threshold temperature for valve transitions. The inventors herein have recognized that systems and methods that provide a direct measurement of the CDVC solenoid condition may enable sooner CDVC solenoid actuation without risking over-current, thereby enabling faster transitions to the VDE mode of operation after engine start for increased fuel savings.

In one example, the issues described above may be addressed by a method comprising: while operating an engine in a first condition, sending a lower command signal to a cylinder deactivation valve control (CDVC) system without actuating a cylinder valve transition; determining an impedance of a solenoid of the CDVC system while sending the lower command signal; and actuating the cylinder valve transition responsive to the determined impedance by sending a higher command signal to the CDVC system. In this way, a condition of the solenoid may be accurately monitored so that the cylinder valve transition may be performed as soon as the risk of over-current is mitigated.

As one example, while operating the engine in a second condition, the cylinder valve transition may be actuated by sending the higher command signal to the CDVC system without first sending the lower command signal. For example, the first condition may correspond to an engine cold start condition, and the second condition may correspond to a warm engine condition. Thus, the CDVC system may be operated with the lower command signal when the solenoid is expected to be cold in order to avoid exceeding a current driver capacity, whereas the valve transition may be performed (e.g., via the higher command signal) when the solenoid is expected to be warm enough that over-current will not occur. As another example, the impedance of the solenoid may be determined based on a current consumed by the solenoid while sending the lower command signal. For example, the current consumed by the solenoid while sending the lower command signal may be determined via a current sensing circuit, thus providing a direct measurement of the solenoid condition.

Further, in order to determine if the solenoid condition enables actuation, the determined impedance may be used to estimate an expected current consumption by the solenoid at the higher command signal. Then, if the expected current draw is less than or equal to a threshold current, the actuation may be performed by operating the CDVC system at the higher command signal. The threshold current may be at or near the current driver capacity, for example. On the other hand, if the expected current draw is greater than the threshold current, the actuation will not be performed, as over-current is expected. Instead, the CDVC system may again be operated at the lower command signal to further increase a temperature of the solenoid, and thus increase the impedance and decrease the current draw at a given command signal. Further, the lower command signal may be increased to expedite solenoid warming while remaining below the higher command signal, thus avoiding actuation. In this way, the valve transition may be enabled faster than if the solenoid is only warmed through engine operation, and the risk of over-current is mitigated.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
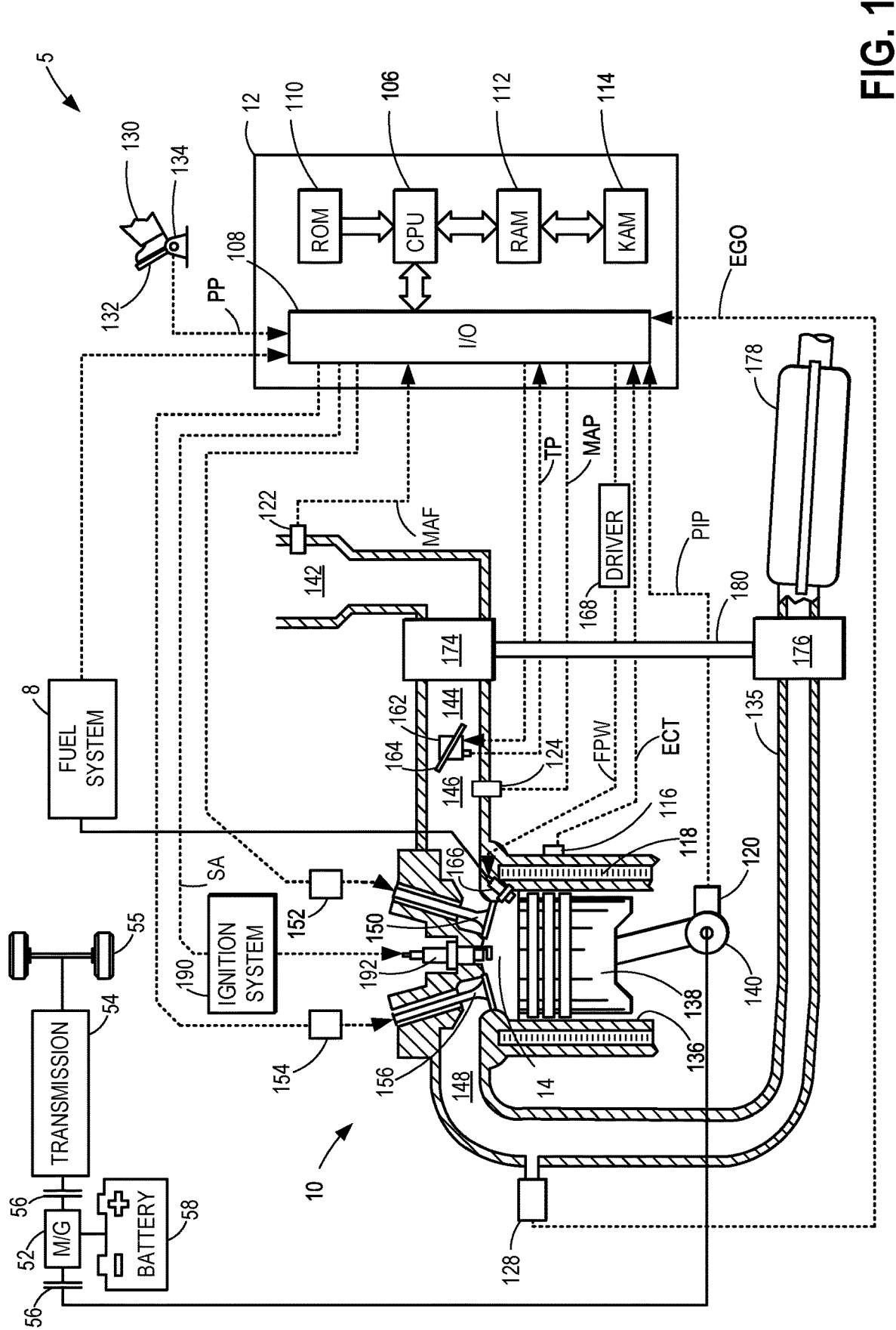
FIG. 1 schematically depicts an example cylinder of an internal combustion engine.
Figure 2:
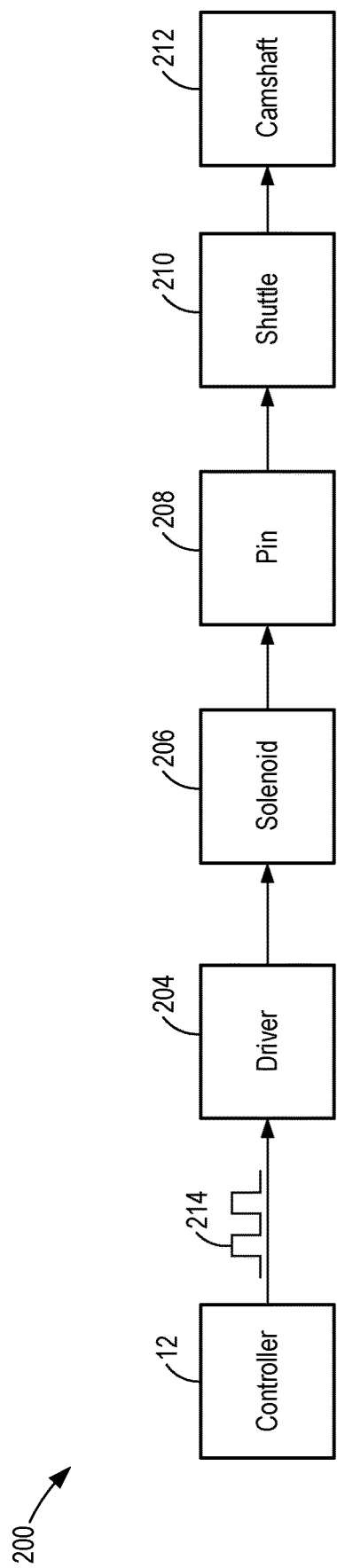
FIG. 2 shows a schematic diagram of a cylinder deactivation valve control system that includes a cam profile switching system.
Figure 3:
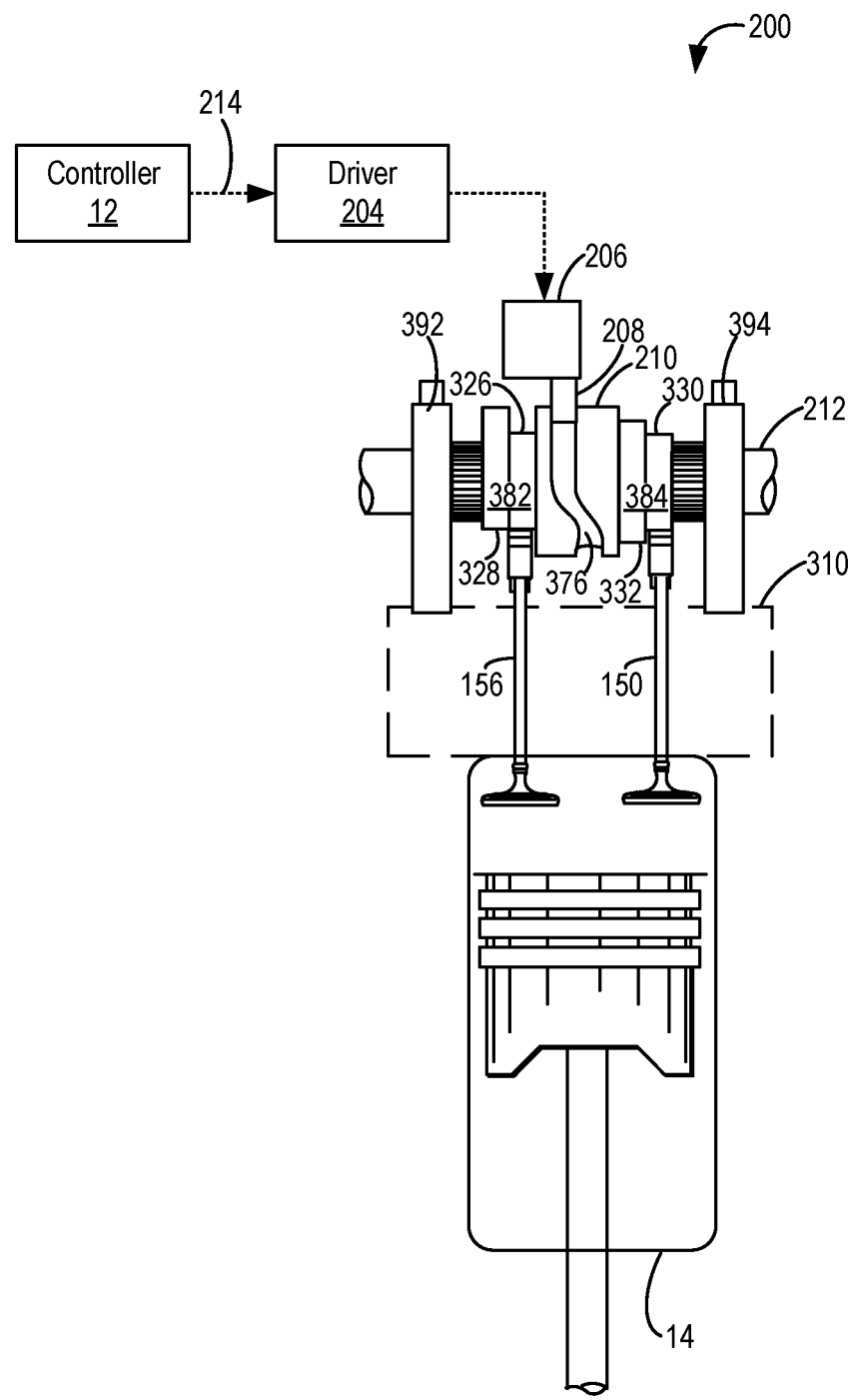
FIG. 3 shows one cylinder of an engine system along with corresponding components of a cam profile switching system that may be included in a cylinder deactivation valve control system.

The following description relates to systems and methods for controlling cylinder valve deactivation and activation in a variable displacement engine, such as the example engine shown in FIG. 1. As shown in FIG. 2, a controller may send a signal to an electrically actuated solenoid of a cylinder deactivation valve control (CDVC) system, and the solenoid may control a pin to activate or deactivate one or more engine cylinders based on engine operating conditions. As shown in FIG. 3, the CDVC system may include a lift cam and a no-lift cam; depending on a position of a shuttle, as controlled by the solenoid, either the lift cam (resulting in cylinder activation) or the no-lift cam (resulting in cylinder deactivation) may be arranged above each cylinder intake and exhaust valve. Further, the controller may determine whether actuation is allowed according to the example method of FIGS. 5A-5B and based on information received from a current sensing circuit, such as the example circuit shown in FIG. 4. An example of adjusting CDVC system operation based on engine operating conditions and a condition of the solenoid is shown in FIG. 6.

Turning now to the figures, FIG. 1 depicts an example of a cylinder 14 of an internal combustion engine 10, which may be included in a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one vehicle wheel 55 via a transmission 54, as further described below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission.

The powertrain may be configured in various manners including as a parallel, a series, or a series-parallel hybrid vehicle. In electric vehicle embodiments, a system battery 58 may be a traction battery that delivers electrical power to electric machine 52 to provide torque to vehicle wheels 55. In some embodiments, electric machine 52 may also be operated as a generator to provide electrical power to charge system battery 58, for example, during a braking operation. It will be appreciated that in other embodiments, including non-electric vehicle embodiments, system battery 58 may be a typical starting, lighting, ignition (SLI) battery coupled to an alternator.

Cylinder 14 of engine 10 can receive intake air via a series of intake passages 142 and 144 and an intake manifold 146. Intake manifold 146 can communicate with other cylinders of engine 10 in addition to cylinder 14. In some examples, one or more of the intake passages may include a boosting device, such as a turbocharger or a supercharger. For example, FIG. 1 shows engine 10 configured with a turbocharger, including a compressor 174 arranged between intake passages 142 and 144 and an exhaust turbine 176 arranged along an exhaust passage 135. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine, and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174. A throttle position sensor may be provided to measure a position of throttle plate 164.

An exhaust manifold 148 can receive exhaust gases from other cylinders of engine 10 in addition to cylinder 14. An exhaust gas sensor 128 is shown coupled to exhaust manifold 148 upstream of an emission control device 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. Emission control device 178 may be a three-way catalyst, a NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake valve 150 may be controlled by controller 12 via an actuator 152. Similarly, exhaust valve 156 may be controlled by controller 12 via an actuator 154. The positions of intake valve 150 and exhaust valve 156 may be determined by respective valve position sensors (not shown) and/or camshaft position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cylinder deactivation valve control (CDVC), cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system). An example cam actuation system that may be included in a CDVC system is described in more detail below with regard to FIGS. 2 and 3.

As further described herein, intake valve 150 and exhaust valve 156 may be deactivated during selected conditions, such as when the full torque capability of the engine is not needed. For example, one or more cylinders of engine 10 may be selected for deactivation by the CDVC system. The number and identity of cylinders selected for deactivation may be symmetrical or asymmetrical, such as by selectively deactivating one or more cylinders on only a first engine bank, selectively deactivating one or more cylinders on only a second engine bank, or selectively deactivating one or more cylinders on each of the first and second engine banks.

Intake valve 150 and exhaust valve 156 may be selectively deactivated via hydraulically actuated lifters (e.g., lifters coupled to valve pushrods), a cam profile switching mechanism (in which a cam lobe with no lift is used for deactivated valves), or electrically actuated cylinder valve mechanisms coupled to each cylinder. In addition, fuel flow and spark to the deactivated cylinders may be stopped, such as by deactivating cylinder fuel injectors. While the selected cylinders are disabled, the remaining enabled or active cylinders continue to carry out combustion, with fuel injectors and cylinder valve mechanisms active and operating. To meet torque requirements, engine 10 produces the same amount of torque on the active cylinders, such as by increasing an average load of each active cylinder compared to when every cylinder of engine 10 is active. This results in lower pumping losses and increased engine efficiency. Also, the lower effective surface area (from only the enabled cylinders) exposed to combustion reduces engine heat losses, increasing the thermal efficiency of engine 10.

In some examples, cylinders may be deactivated to provide a specific firing (or skip-fire) pattern based on a designated control algorithm. More specifically, selected "skipped" engine cycles are not fired while other "active" engine cycles are fired. Optionally, a spark timing associated with a selected firing of a selected active (e.g., enabled) cylinder may also be adjusted based on a firing order or firing history of the selected cylinder. Controller 12 may be configured with suitable logic for determining a cylinder deactivation (or skip-firing) pattern based on engine operating conditions, as will be elaborated below with respect to FIGS. 5A-5B.

Cylinder 14 can have a compression ratio, which is a ratio of volumes when piston 138 is at bottom dead center (BDC) to top dead center (TDC). In one example, the compression ratio is in the range of 9:1 to 10:1. However, in some examples, such as where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at or near maximum brake torque (MBT) timing to maximize engine power and efficiency. Alternatively, spark may be provided retarded from MBT timing to create a torque reserve. Controller 12 may input engine operating conditions, including engine speed, engine load, and exhaust gas AFR, into a look-up table and output the corresponding spark timing for the input engine operating conditions, for example.

In some examples, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse-width of signal FPW received from controller 12 via electronic driver 168. In this manner, fuel injector 166 provides what is known as direct injection (hereafter also referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12.

It will be appreciated that in an alternative embodiment, injector 166 may be a port injector providing fuel into the intake port upstream of cylinder 14. Further, while the example embodiment shows fuel injected to the cylinder via a single injector, the engine may alternatively be operated by injecting fuel via multiple injectors, such as one direct injector and one port injector. In such a configuration, the controller may vary a relative amount of injection from each injector. Fuel may be delivered by fuel injector 166 to the cylinder during a single cycle of the cylinder. Further, the distribution and/or relative amount of fuel or knock control fluid delivered from the injector may vary with operating conditions, such as air charge temperature, as described herein below. Furthermore, for a single combustion event, multiple injections of the delivered fuel may be performed per cycle. The multiple injections may be performed during the compression stroke, intake stroke, or any appropriate combination thereof.

Fuel tanks in fuel system 8 may hold fuels of different fuel types, such as fuels with different fuel qualities and different fuel compositions. The differences may include different alcohol contents, different water contents, different octane numbers, different heats of vaporization, different fuel blends, and/or combinations thereof, etc. One example of fuels with different heats of vaporization includes gasoline as a first fuel type with a lower heat of vaporization and ethanol as a second fuel type with a greater heat of vaporization. In another example, the engine may use gasoline as a first fuel type and an alcohol-containing fuel blend, such as E85 (which is approximately 85% ethanol and 15% gasoline) or M85 (which is approximately 85% methanol and 15% gasoline), as a second fuel type. Other feasible substances include water, methanol, a mixture of ethanol and water, a mixture of water and methanol, a mixture of alcohols, etc. In still another example, both fuels may be alcohol blends with varying alcohol compositions, wherein the first fuel type may be a gasoline alcohol blend with a lower concentration of alcohol, such as E10 (which is approximately 10% ethanol), while the second fuel type may be a gasoline alcohol blend with a greater concentration of alcohol, such as E85 (which is approximately 85% ethanol). Additionally, the first and second fuels may also differ in other fuel qualities, such as a difference in temperature, viscosity, octane number, etc. Moreover, fuel characteristics of one or both fuel tanks may vary frequently, for example, due to day to day variations in tank refilling.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including the signals previously discussed and additionally including a measurement of inducted mass air flow (MAF) from a mass air flow sensor 122; an engine coolant temperature (ECT) from a temperature sensor 116 coupled to a cooling sleeve 118; a profile ignition pickup signal (PIP) from a Hall effect sensor 120 (or other type) coupled to crankshaft 140; throttle position (TP) from the throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold. Controller 12 may infer an engine temperature based on the engine coolant temperature.

Controller 12 receives signals from the various sensors of FIG. 1 and employs the various actuators of FIG. 1 to adjust engine operation based on the received signals and instructions stored on a memory of the controller. For example, upon receiving signals from various sensors, such as MAF from MAF sensor 122 and MAP from MAP sensor 124, controller 12 may transition the engine to operating in a VDE mode, wherein one or more cylinders are deactivated, as further described below with respect to FIGS. 5A-5B.

As described above, FIG. 1 shows only one cylinder of a multi-cylinder engine. As such, each cylinder may similarly include its own set of intake/exhaust valves, fuel injector(s), spark plug(s), etc. It will be appreciated that engine 10 may include any suitable number of cylinders, including 2, 3, 4, 5, 6, 8, 10, 12, or more cylinders in various configurations. Further, each of these cylinders can include some or all of the various components described and depicted by FIG. 1 with reference to cylinder 14.

Next, FIG. 2 schematically shows an example cylinder deactivation valve control (CDVC) system 200 that includes an electrically-actuated cam profile switching (CPS) system. As will be detailed herein, CDVC system 200 may control cam profiles, and thereby control activation and deactivation of engine cylinders. FIG. 2 will be described with respect to the system and components introduced in FIG. 1, although other systems and components are also possible.

Controller 12 introduced in FIG. 1 (or, alternatively, a dedicated CDVC system controller in electronic communication with controller 12) may send a pulse-width modulation (PMW) control (or command) signal 214 to a current driver 204. Current driver 204 processes the signal and sends the processed signal to a solenoid 206. As will be further described below with respect to FIGS. 5A-5B, a duty cycle percentage (or ratio) of control signal 214 may be at or above a threshold duty cycle for actuating solenoid 206. Solenoid 206 may be an electromechanical actuator that controls the movement of a pin 208 in a groove of a shuttle 210, as will be elaborated below with respect to FIG. 3. Shuttle 210 may be physically coupled with a camshaft 212 such that the movement of pin 208 in the groove of the shuttle affects rotation of the camshaft. As will be detailed below (e.g., at FIG. 3), due to the curvature of the groove, the movement of the pin in the groove may modify a cam lift profile, resulting in activation or deactivation of one or more valves (and thus, one or more engine cylinders). For example, movement of the pin in the groove may cause the shuttle to move along the camshaft axially. The axial movement of the shuttle along the camshaft may change the cam lift profile by moving a currently used cam away from an intake or exhaust valve and moving in another cam to communicate with the valve (depending on an angle of rotation of the camshaft).

As will be elaborated below with respect to FIGS. 5A-5B, controller 12 may adjust the duty cycle of control signal 214 sent to current driver 204 in order to actuate solenoid 206 to trigger a valve transition or to increase a temperature of solenoid 206 without a valve transition. For example, current driver 204 may be operated at a first, lower level (e.g., a lower duty cycle) that does not actuate solenoid 206 to trigger a valve transition, and a resulting electrical current feedback on the driver circuit may be measured. Controller 12 may calculate an impedance of solenoid 206 based in part on the measured electrical current feedback of the driver circuit. Controller 12 may then use the calculated impedance to estimate an expected current draw at a second, higher level (e.g., a higher duty cycle) that actuates solenoid 206 to trigger a valve transition. If the estimated current draw is higher than a capability of current driver 204, the valve transition may not be performed. Further, the controller may adjust (e.g., increase) the lower level while remaining below a level for actuation in order to warm solenoid 206, thus increasing the impedance and enabling the valve transition to be performed more quickly.

In other examples, CDVC system 200 may include a hydraulic actuator, such as a spool valve in place of pin 208. In such an example, solenoid 206 may be an electrohydraulic actuator that controls the spool valve, which may control a flow of hydraulic fluid (e.g., to the spool valve) for adjusting a position of the spool valve in the groove of shuttle 210 to modify the cam lift profile. In each example, solenoid 206 is an electromagnet including a coil that produces a uniform magnetic field when electric current is passed through the coil, the magnetic field causing movement of the pin or the spool valve.

FIG. 3 schematically shows a partial side view of cylinder 14 introduced in FIG. 1 having valves controlled by CDVC system 200 introduced in FIG. 2. Thus, components of FIG. 3 that function similarly to components of FIGS. 1 and 2 are numbered the same and may not be reintroduced. As mentioned above, CDVC system 200 may activate or deactivate cylinder 14 depending on engine operating conditions. For example, as described in more detail below, by adjusting cylinder cam mechanisms, cylinder valves may be operated with or without valve lift based on engine operating conditions. However, in other examples, cylinder 14 (and the rest of the cylinders of engine 10 of FIG. 1) may be operable in multiple different valve lift modes, such as high valve lift mode and a low valve lift, in addition to or as an alternative to being activated or deactivated.

In the example shown in FIG. 3, intake valve 150 and exhaust valve 156 are both driven by cams on camshaft 212, which serves as a common camshaft. However, in other examples, intake valve 150 (and any other intake valves of cylinder 14) may be driven by a dedicated intake camshaft, and exhaust valve 156 (and any other exhaust valves of cylinder 14) may be driven by a separate, dedicated exhaust camshaft. Each intake and exhaust valve is configured to open and close an intake port and an exhaust port of cylinder 14, respectively. Each valve includes a mechanism coupled to camshaft 212 above the valve for adjusting an amount of valve lift for that valve and/or for deactivating that valve. For example, cylinder 14 includes mechanisms 382 and 384 coupled to camshaft 212 above exhaust valve 156 and intake valve 150, respectively. In the depicted example, each of mechanisms 382 and 384 includes two cams having different lift profiles. Mechanism 382 includes a no-lift cam 326 and a lift cam 328, and mechanism 382 includes a no-lift cam 330 and a lift cam 332. However, it will be understood that the mechanisms may include additional lift profiles without departing from the scope of this disclosure (e.g., a high lift cam and a low lift cam).

As shown in FIG. 3, the cam mechanisms may be positioned directly above a corresponding valve in cylinder 14. Further, the cam mechanisms may be slideably attached to camshaft 212 so that they can slide along the camshaft on a per-cylinder basis. For example, FIG. 3 shows an example where the no-lift cams 326 and 330 are positioned above exhaust valve 156 and intake valve 150, respectively. Further, cam towers, such as cam towers 392 and 394 shown in FIG. 3, may be coupled to a cylinder head 310 of the engine. However, in other examples, the cam towers may be coupled to other components of an engine block, such as a camshaft carrier or a cam cover. The cam towers 392 and 394 may support the overhead camshafts and may separate the mechanisms positioned on the camshafts above each cylinder from one another.

CDVC system 200 may control the camshaft 212 (or the separate intake and exhaust camshafts) to activate and deactivate engine cylinders via contact between pin 208 coupled with solenoid 206 and shuttle 210. As shown, a snaking groove 376 may traverse a circumference of shuttle 210, such that movement of the pin in the groove may effect axial movement of the shuttle along the camshaft. That is, CDVC system 200 may be configured to translate the shuttle along the camshaft longitudinally, thereby causing operation of intake valve 150 to vary between cams 330 and 332 (and/or other cams, when included) and exhaust valve 156 to vary between cams 326 and 328 (and/or other cams, when included) by sliding the cams relative to the intake and exhaust valves. The sets of cams positioned above each cylinder valve may be slid along the camshaft to change a lobe profile coupled to a valve follower mechanism to change the valve opening and closing durations. For example, mechanism 382 positioned above exhaust valve 156 may be shifted to move corresponding lift cam 328 to a position above exhaust valve 156 so that the lift profile associated with lift cam 328 is used to control the opening and closing of exhaust valve 156. At the same time, mechanism 384 positioned above intake valve 150 may be shifted to move corresponding lift cam 332 to a position above intake valve 150 so that the lift profile associated with lift cam 332 is used to control the opening and closing of intake valve 150. In this way, CDVC system 200 may switch between multiple cam profiles, with solenoid 206 configured as an electromechanical actuator for transitioning the intake valve and the exhaust valve between the active and deactivated states via the cam profile switching.

While not shown, in hydraulic embodiments, a spool valve rather than pin 208 may physically communicate with the shuttle to effect axial movement of the shuttle. As such, a hydraulic solenoid valve may be coupled in a hydraulic circuit of an engine, which may be further coupled to a cylinder valve actuator.

CDVC system 200 may actuate each of intake valve 150 and exhaust valve 156 between lift cams 332 and 328, respectively, which allow intake valve 150 to open for intake air to enter cylinder 14 and exhaust valve 156 to open to exhaust gas out of cylinder 14, and no-lift cams 330 and 326, respectively, which maintain intake valve 150 and exhaust valve 156 closed, via camshaft 212. In the present example, no-lift cams 326 and 330 have a no-lift cam lobe profile for deactivating their respective cylinders based on engine operating conditions. Further, in the present example, lift cams 328 and 332 have a lift cam lobe profile, which is larger than the no-lift cam lobe profile, for opening the intake or exhaust valve.

Although FIG. 3 shows a single CDVC system 200 for deactivating (or activating) both intake valve 150 and exhaust valve 156, in other examples, intake valve 150 and exhaust valve 156 may be adjusted by separate CDVC systems. For example, controller 12 may send a first control signal to a first current driver to actuate an intake valve transition. The first current driver may process the first control signal and send the processed signal to a first solenoid coupled to a first pin to move the first pin in a groove of a first shuttle. The movement of the first pin within the groove of the first shuttle may translate mechanism 384 along camshaft 212 but may not translate mechanism 382 along camshaft 212. Therefore, if an exhaust valve transition is also desired, controller 12 may send a second control signal to a second current driver to actuate the exhaust valve transition. The second current driver may process the second control signal and send the processed signal to a second solenoid coupled to a second pin to move the second pin in a groove of a second shuttle. The movement of the second pin within the groove of the second shuttle may translate mechanism 382 along camshaft 212 and not mechanism 384. Similarly, the deactivation of intake valve 150 and exhaust valve 156 may be controlled via separate CDVC systems when intake valve 150 and exhaust valve 156 are actuated by separate camshafts. When intake valve 150 and exhaust valve 156 are controlled via separate CDVC systems, intake valve 150 and exhaust valve 156 may be deactivated simultaneously or sequentially (e.g., based on camshaft angle). Further, in some examples, only the intake valve may be deactivated or only the exhaust valve may be deactivated, allowing the cylinder to operate in various modes.

Additional elements not shown in FIG. 3 may include push rods, rocker arms, tappets, etc. Such devices and features may control actuation of the intake valves and the exhaust valves by converting rotational motion of the cams into translational motion of the valves. In other examples, the valves may be actuated via additional cam lobe profiles on the camshaft(s), where the cam lobe profiles between the different valves may provide varying cam lift height, cam duration, and/or cam timing. However, alternative camshaft (overhead and/or pushrod) arrangements could be used, if desired. Further, in some examples, the cylinder may include more than one intake and/or exhaust valve. In still other examples, as mentioned above, exhaust valve(s) and intake valve(s) may be actuated by separate camshafts and/or separate CDVC systems.

The configuration of cams described above may be used to control of the amount and timing of gas supplied to and exhausted from cylinder 14. However, other configurations may be used to enable CDVC system 200 to switch valve control between two or more cams. For example, a switchable tappet or rocker arm may be used for varying valve control between two or more cams. The valve/cam control devices and systems described above may be hydraulically powered, electrically actuated, or combinations thereof.

As used herein, active valve operation may refer to a valve opening and closing during a cycle of the cylinder, whereas deactivated valves may be held in a closed position for a cycle of the cylinder (or held in a fixed position for the cycle). It will be appreciated that the above configurations are examples, and the approaches discussed herein may be applied to a variety of different variable valve lift profile systems and configurations.

It should be appreciated that the above example shows a system by which actuation of a solenoid is achieved using a PWM control signal, which is electrically amplified by a current driver. The current driver has a maximum current capability requirement that may not be exceeded. However, solenoid impedance varies with solenoid temperature, and the current drawn by the solenoid (at a fixed voltage) is a function of the solenoid impedance. At lower solenoid temperatures, the effective solenoid impedance may be so low that the potential current drawn by the solenoid is greater than the maximum current capability of the current driver, preventing CDVC system actuation during an engine cold start, for example.

Figure 4:
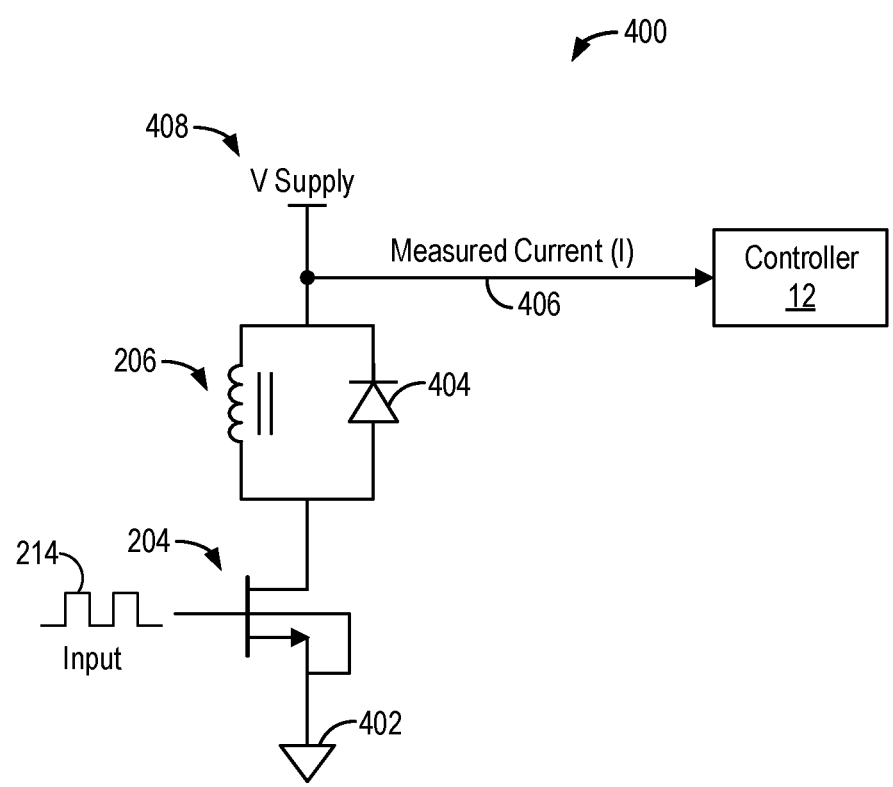
FIG. 4 shows a diagram of an example circuit for driving a solenoid of a cylinder deactivation valve control system that includes a current feedback signal.

Therefore, FIG. 4 depicts a diagram of an example current sensing circuit 400 that may be included in CDVC system 200 of FIGS. 2 and 3 for providing an electrical current feedback signal to the controller 12. Thus, components of FIG. 4 that function the same as components described in FIGS. 2 and 3 are numbered the same and may not be reintroduced. Current sensing circuit 400 includes current driver 204, which receives control signal 214 (e.g., from controller 12) for driving solenoid 206. Solenoid 206 is electrically connected to a voltage supply 408. Voltage supply 408 may be a vehicle battery, for example (e.g., battery 58 shown in FIG. 1). A measured current drawn by solenoid 206 may be communicated to controller 12 via an electrical current feedback signal 406. Electrical current feedback signal 406 may be used by controller 12 to calculate an impedance of solenoid 206 to determine if actuation is enabled, as will be elaborated below with respect to FIGS. 5A and 5B. Current sensing circuit 400 also includes a ground 402 and a diode 404, which may reduce high voltage transients during operation, for example. As one example, as shown, electrical current feedback signal 406 may be used to monitor current consumption by a single solenoid 206. However, in other examples, multiple CDVC solenoids may be monitored by a single electrical current feedback signal 406.

Figure 5A:
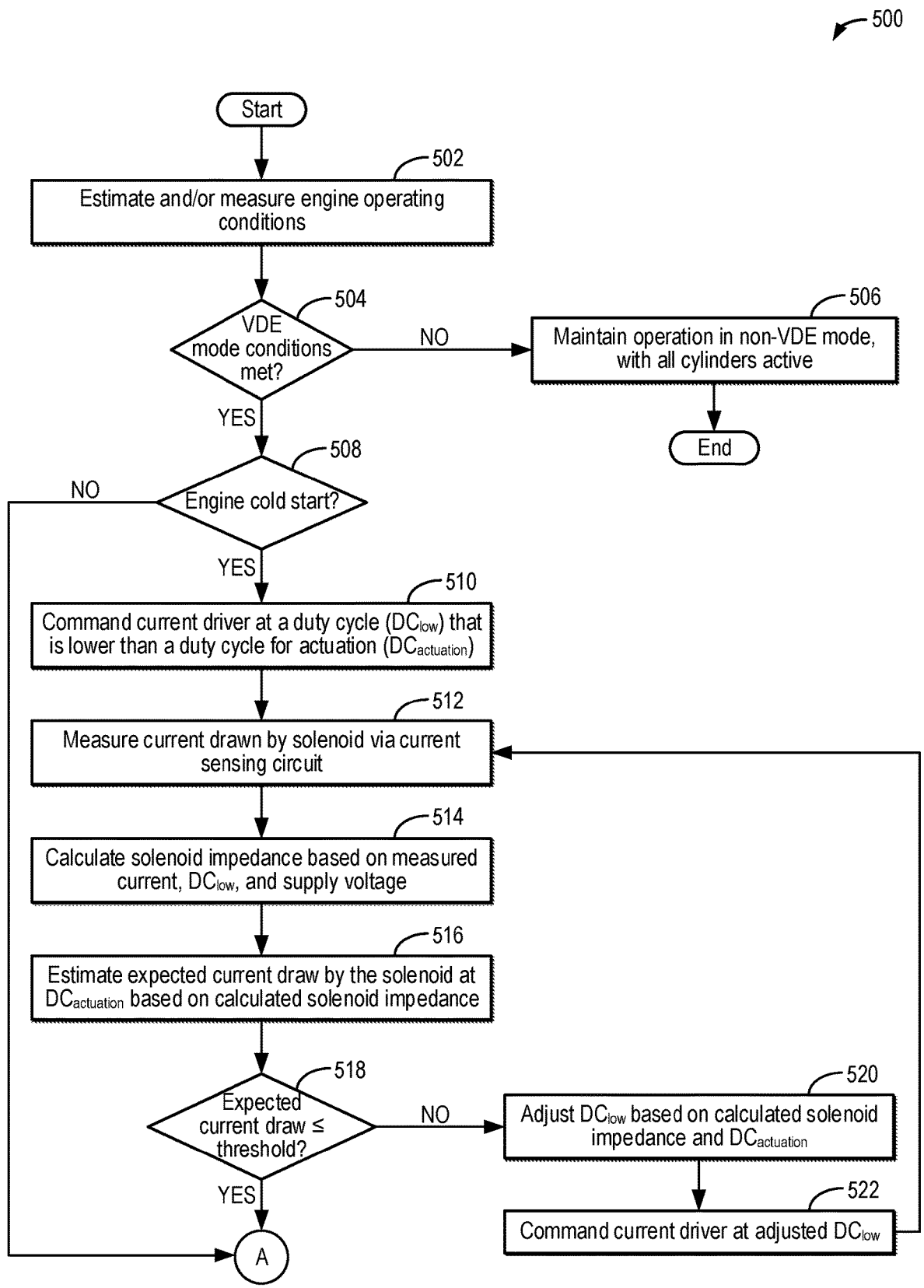
FIGS. 5A-5B show an example method for monitoring a condition of a cylinder deactivation valve control system solenoid and controlling the cylinder deactivation valve control system accordingly to selectively deactivate one or more engine cylinders.
Figure 5B:
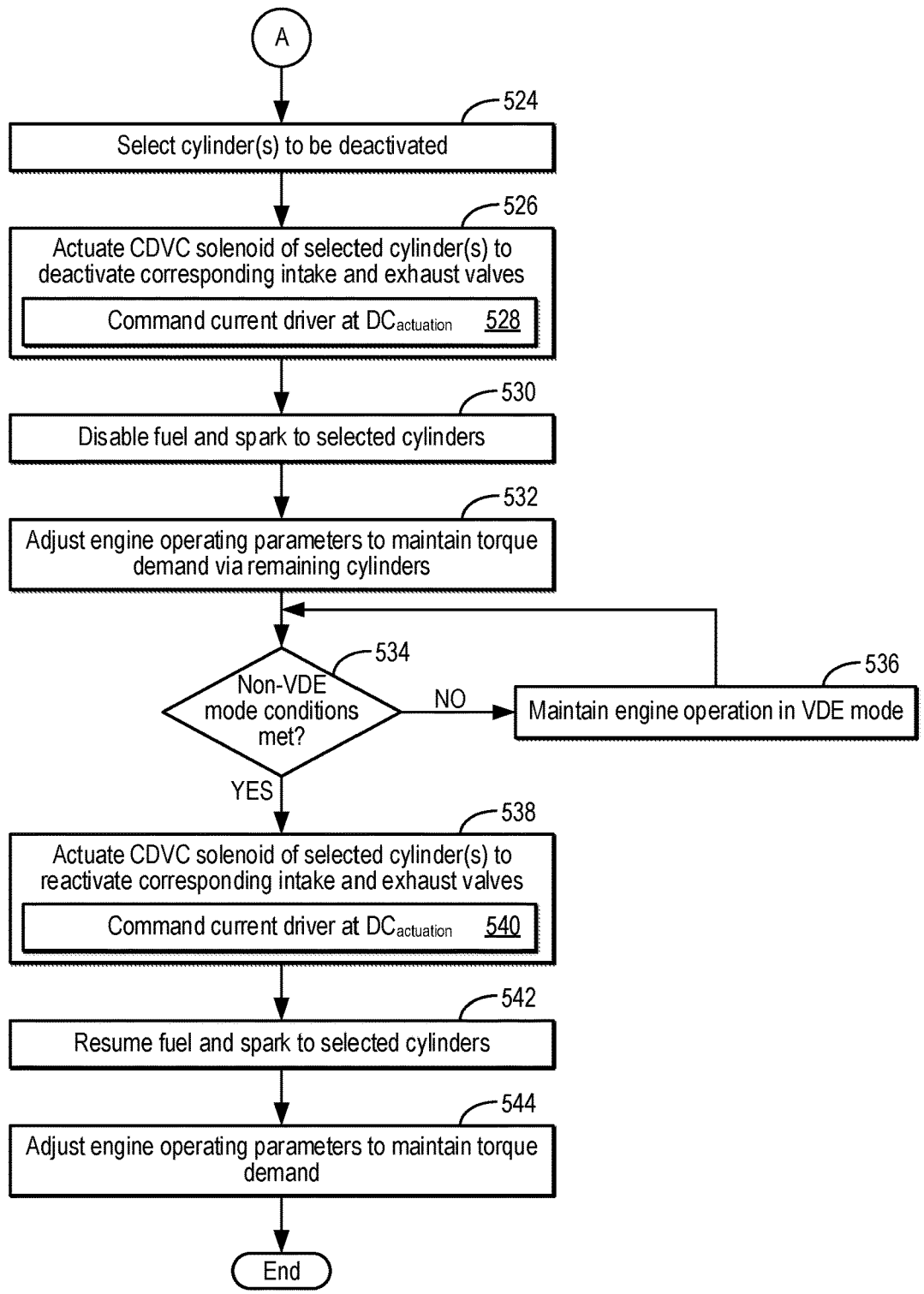
Figure 6:
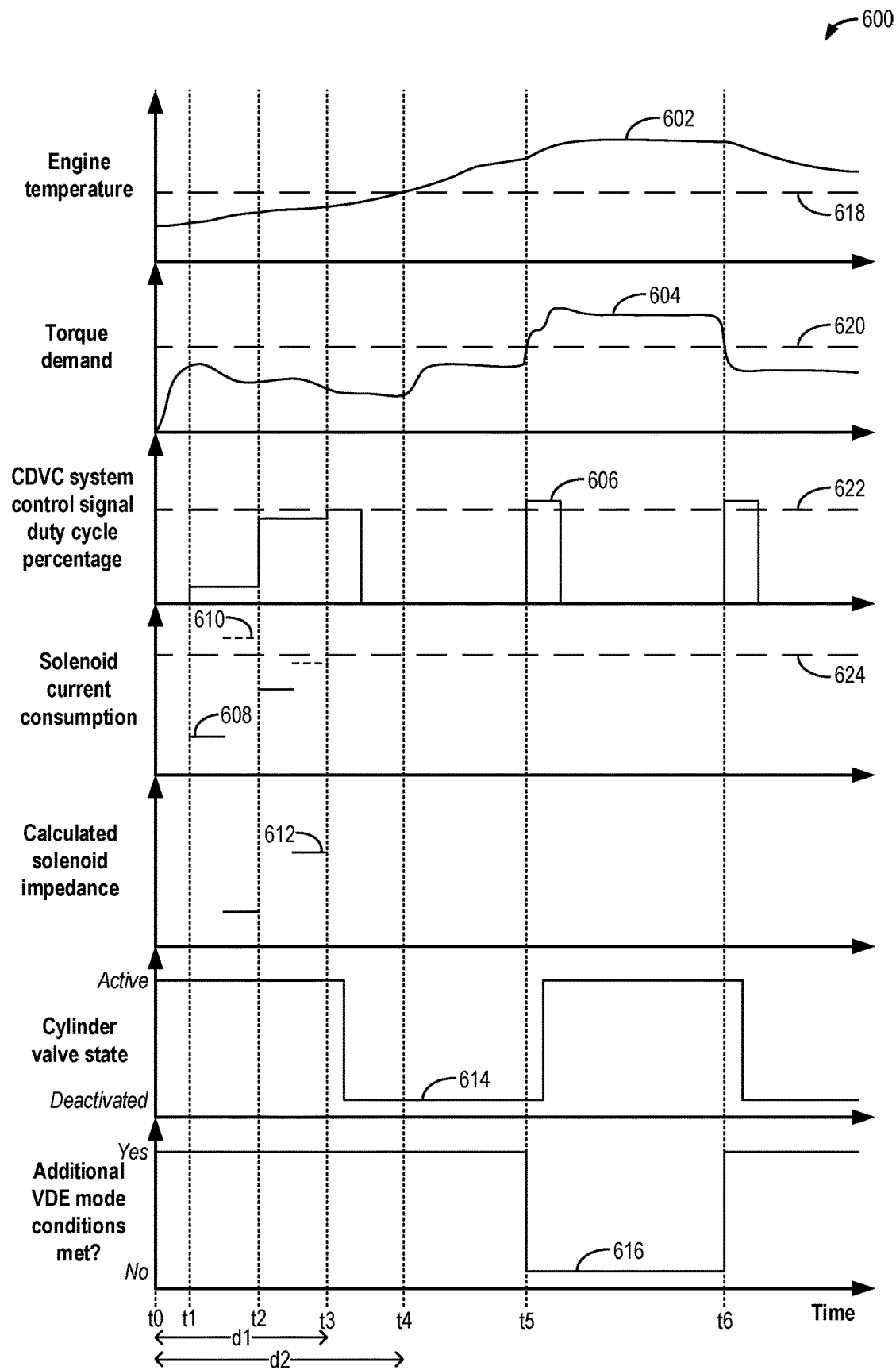
FIG. 6 shows a prophetic example timeline for monitoring and controlling a cylinder deactivation valve control system based on engine operating conditions.

Next, FIGS. 5A and 5B illustrate an example method 500 for monitoring an electrical current drawn by a solenoid of a CDVC system, such as solenoid 206 of CDVC system 200 introduced in FIG. 2, and controlling the CDVC system accordingly to selectively deactivate one or more cylinders based on engine operating conditions. For example, method 500 may be used for transitioning to a VDE mode of engine operation (where one or more cylinders are deactivated and do not produce torque) from a non-VDE mode of engine operation (where combustion occurs in every engine cylinder to produce torque via every cylinder) while preventing over-current on a current driver of the CDVC system (e.g., current driver 204 shown in FIGS. 2-4). Method 500 may also be used for transitioning from the VDE mode of operation to the non-VDE mode of operation. Further, it should be understood that method 500 may be used to assess multiple CDVC solenoids simultaneously. Instructions for carrying out method 500 and the rest of the methods included herein may be executed by a controller (e.g., controller 12 of FIGS. 1-4) based on instructions stored on a memory of the controller and in conjunction with signals received from sensors of the engine system, such as the sensors described above with reference to FIG. 1. The controller may employ engine actuators of the engine system to adjust engine operation according to the methods described below.

At 502, method 500 includes estimating and/or measuring engine operating conditions. The engine operating conditions may include, for example, engine speed, engine load, driver torque demand, boost pressure, MAP, MAF, vehicle speed, engine temperature, ambient conditions (such as ambient temperature, pressure, and humidity), etc. The operating conditions may be measured (e.g., by sensors) or inferred based on available data. In particular, the engine temperature may be measured by a temperature sensor coupled to a cooling sleeve (e.g., temperature sensor 116 of FIG. 1). The torque demand may be determined based on a position of an accelerator pedal, such as measured by a pedal position sensor (e.g., pedal position sensor 134 of FIG. 1), for example.

At 504, it may be determined if the estimated engine conditions enable entry of the engine into the VDE mode, where the engine is operated with one or more cylinders selectively deactivated. As one example, VDE mode entry conditions may be met if the torque demand is below a threshold torque. The threshold torque may refer to a positive, non-zero amount of torque that cannot be met while operating in VDE mode with deactivated cylinders. For example, when the torque demand is less than the threshold torque, the torque demand may be met by the remaining active cylinders while one or more cylinders is deactivated, as further described below. If the VDE mode entry conditions are not met, at 506, the method includes maintaining operation in the non-VDE mode, with all cylinders active. Thus, every cylinder of the engine will continue combusting air and fuel to produce torque, with the intake and exhaust valves of every cylinder opening and closing at designated times throughout an engine cycle. Method 500 may then end.

If VDE entry conditions are met, method 500 proceeds to 508 and includes determining if an engine cold start condition is present. As an example, the cold start condition may be confirmed when engine temperature is less than a threshold temperature. The threshold temperature may correspond to a non-zero, positive temperature value stored in a memory of the controller, above which the engine is considered to be warm and at a steady state operating temperature. As another example, the cold start condition may be confirmed when the engine temperature is substantially equal to the ambient temperature (e.g., within a threshold of the ambient temperature, such as within 10° C.). As still another example, the cold start condition may be confirmed when the engine has been inactive for greater than a threshold duration, which may correspond to a non-zero amount of time stored in the memory of the controller (e.g., minutes, hours, or days), over which the engine is expected to cool to approximately ambient temperature.

If the engine cold start condition is not present, method 500 proceeds to 524 (shown in FIG. 5B) and includes selecting cylinder(s) to be deactivated, as will be elaborated below. For example, if the cold start condition is not present, it may be assumed that the CDVC solenoid is at a high enough temperature, and therefore has a high enough impedance, that the current drawn during actuation will not exceed the maximum current limit of the current driver. Therefore, the engine may be transitioned to the VDE mode of operation for increased fuel economy and engine efficiency by deactivating one or more cylinders.

However, if the engine cold start condition is present, method 500 proceeds to 510 and includes commanding the current driver at a duty cycle that is lower than a duty cycle for actuation. With the cold start condition present, it may be assumed that the CDVC solenoid temperature, and therefore the impedance, is so low that the current drawn during actuation may exceed a maximum current limit of the current driver. Therefore, the controller may apply a command signal to the current driver having a first, lower duty cycle ($DC_{low}$) that is less than a second, higher duty cycle that is known to actuate the solenoid ($DC_{actuation}$). As an example, $DC_{actuation}$ may be the lowest (e.g., minimum) known duty cycle that results in solenoid actuation and may be stored in the memory of the controller. Thus, $DC_{actuation}$ may be a threshold duty cycle for solenoid actuation, and $DC_{low}$ is lower than the threshold duty cycle. Further, $DC_{low}$ may be selected as a pre-determined lower duty cycle stored in the memory of the controller, the pre-determined lower duty cycle being low enough that even if the solenoid has the lowest possible impedance, over-current will not occur. Each of $DC_{low}$ and $DC_{actuation}$ may be duty cycle percentages or ratios, for example. As one example, the command signal may be sent continuously so that the solenoid temperature is quickly increased while the current remains below a switching threshold for actuating the solenoid, particularly where the CDVC system is configured with one current sensing circuit for each solenoid. As another example, the command signal may be sent for a fixed duration, particularly where the CDVC system is configured such that multiple CDVC solenoids (e.g., for controlling the valve state of multiple, separate cylinder valves) are monitored by a single current sensing circuit. Further, in some examples, the duty cycle may be held in between current sensing events, may be reduced to a duty cycle selected based on the lowest possible impedance of the solenoid in between current sensing events, or may be continuously updated in real-time or near real-time (e.g., when the current drawn by the solenoid is sensed continuously), as will be further described below at 520 and 522.

At 512, method 500 includes measuring the current drawn by the solenoid via a current sensing circuit. The current sensing circuit, such as the current sensing circuit 400 depicted in FIG. 4, for example, enables a direct measurement of the current consumed by the solenoid while the current driver is commanded at $DC_{low}$. Thus, the current sensing circuit gives an indication of the solenoid condition.

At 514, method 500 includes calculating the solenoid impedance based on the measured current, $DC_{low}$, and the supply voltage. The supply voltage may be a constant value stored in the memory of the controller, for example. As one example, the supply voltage may be provided by a 12 V battery. Further, the product of the supply voltage and the commanded duty cycle yields an average voltage supplied to the solenoid while the current driver is commanded at $DC_{low}$. For example, the controller may input the measured current ($I_{measured}$), $DC_{low}$ (e.g., the commanded duty cycle), and the supply voltage (V) into the following equation, which is derived from Ohm's law and may be stored in the memory of the controller, to calculate the solenoid impedance (Z):

$$Z = \frac{DC_{low} \times V}{I_{measured}}$$

In some examples, the controller may determine the solenoid impedance in real-time or near real-time by continuously inputting the measured current into the above equation as it is measured. Thus, the solenoid impedance is learned based on the measured current drawn while applying the control signal at $DC_{low}$.

At 516, method 500 includes estimating an expected current draw by the solenoid at $DC_{actuation}$ based on the calculated solenoid impedance (e.g., as calculated at 514). That is, the controller estimates the current consumption by the solenoid that would occur if the current driver were commanded at the minimum duty cycle for solenoid actuation. For example, the controller may input the calculated solenoid impedance (Z), $DC_{actuation}$, and the supply voltage (V) into the following equation, which may be stored in the memory of the controller, to calculate the expected current draw ($I_{expected}$):

$$I_{expected} = \frac{DC_{actuation} \times V}{Z}$$

In some examples, the controller may determine the expected current draw by the solenoid while applying a control signal at $DC_{actuation}$ in real-time or near real-time by inputting the calculated solenoid impedance into the above equation as it is determined.

At 518, method 500 includes determining if the expected current draw (e.g., as estimated at 516) is less than or equal to a threshold current. The threshold current may be a pre-determined, non-zero current value stored in a memory of the controller that is at or near the maximum current limit of the current driver. As one non-limiting example, the maximum current limit of the current driver may be 2.2 A at steady state. Therefore, the threshold current may be a small amount (e.g., 1-5%) less than the maximum current limit of the driver to account for any inaccuracies in the estimation of the expected current draw, for example, thus providing a buffer to prevent over-current on the current driver. As one non-limiting example, the threshold current may be 2 A. As another non-limiting example, the threshold current may be in a range from 1.9 A to 2.1 A.

If the expected current draw at the minimum duty cycle for solenoid actuation is not less than or equal to the threshold current, the solenoid cannot be actuated without risking over-current on the current driver. However, the flow of electric current through the solenoid increases the solenoid temperature, and therefore the impedance. As such, the current draw would decrease if the command signal were held at a fixed duty cycle. Therefore, method 500 proceeds to 520 and includes adjusting $DC_{low}$ based on the calculated solenoid impedance (e.g., as calculated at 514) and $DC_{actuation}$. For example, $DC_{low}$ may be adjusted to a higher duty cycle that remains lower than $DC_{actuation}$ to prevent unintentional actuation. For example, a degree to which $DC_{low}$ is increased may be based in part on the calculated solenoid impedance, with $DC_{low}$ further increasing as the calculated solenoid impedance increases. As one example, the controller may determine an updated, higher duty cycle for $DC_{low}$ to achieve a desired current draw by the solenoid using the calculated impedance, the known supply voltage, and known Ohm's law relationships. For example, the desired current draw may be a pre-determined value that is less than the threshold current. As another example, the desired current draw may be equal to the threshold current. Thus, once the solenoid impedance is determined, $DC_{low}$ may be set as high as possible for maximizing the current draw by the solenoid while still preventing over-current as well as unintentional actuation.

At 522, method 500 includes commanding the current driver at the adjusted $DC_{low}$. The controller may transmit a command signal to the current driver at the adjusted $DC_{low}$ (which remains lower than $DC_{actuation}$), thereby increasing the temperature of the solenoid, and thus the impedance. Method 500 may then return to 512 so that the current drawn by the solenoid is again measured so that the calculated solenoid impedance may be updated (e.g., at 514, using the adjusted $DC_{low}$). The controller may again estimate the expected current draw by the solenoid at $DC_{actuation}$ with the updated impedance (e.g., at 516) to determine if the expected current draw remains above the threshold current (e.g., at 518). The controller may continue cycling through adjusting $DC_{low}$ and commanding the current driver at the adjusted $DC_{low}$ in this manner until the expected current draw is no longer above the threshold current, for example. In examples where the command signal is sent continuously and the current drawn by the solenoid is monitored continuously, $DC_{low}$ may be continuously adjusted in real-time or near real-time to account for the changing impedance (and thus the changing current consumption) as the solenoid warms.

Returning to 518, if the expected current draw is less than or equal to the threshold current, method 500 proceeds to 524 and includes selecting the cylinder(s) to be deactivated. This includes selecting a total number of cylinders to deactivate as well as an identity of the cylinders to be deactivated. For example, the controller may select a group of cylinders and/or an engine bank to deactivate based on the engine operating conditions. As another example, the number of cylinders to be deactivated may increase as the driver torque demand decreases. As one illustrative example, for an engine having two banks of cylinders, half the total number of engine cylinders may be deactivated by deactivating all cylinders of one bank while maintaining all cylinders of the other bank active. Alternatively, an equal number of cylinders may be deactivated from both banks. Further, the selection may be based on, for example, which group of cylinders was deactivated during a previous VDE mode operation. For example, if a first group of cylinders was deactivated during the previous VDE mode operation, then the controller may select a second group of cylinders (e.g., the remaining cylinders) for deactivation during the present VDE mode operation. Alternatively, hardware may restrict deactivation to pre-selected cylinders. Using a V-8 engine as an example, the hardware may restrict deactivation to two specific cylinders from each engine bank. In such an example, the controller may select the cylinders to be deactivated based on the hardware restrictions. As still another example, additionally or alternatively, the cylinders to be deactivated may be selected in order to mitigate engine noise, vibration, and harshness (NVH) depending on a configuration of the engine (e.g., a layout and a total number of cylinders).

In still other examples, the controller may determine a desired induction ratio (a total number of cylinder firing events divided by a total number of cylinder compression strokes) based at least on torque demand. The controller may determine the number of cylinders to deactivate (or the desired induction ratio) by inputting the operating conditions, such as the torque demand and/or the engine load, into one or more look-up tables, maps, or algorithms stored in memory, which may output the number of cylinders to deactivate for the given conditions. As an example, the pattern for an induction ratio of 0.5 may include every other cylinder being fired (wherein combustion is carried out within the cylinder, with intake and exhaust valves opening and closing during a cycle of the cylinder) or deactivated (wherein fueling is disabled and combustion does not occur). Selecting the cylinder deactivation pattern further includes determining a duration of deactivation of each cylinder in the selected pattern. For example, the controller may determine a number of combustion events or engine cycles over which to maintain the selected cylinders deactivated. In some examples, the same pattern may be applied for each consecutive engine cycle such that the same cylinders are deactivated (e.g., skipped) on consecutive engine cycles while the remaining cylinders are fired on each of the engine cycles. In other examples, different cylinders may be deactivated on each engine cycle such that the activation and deactivation is cycled or distributed uniformly amongst the engine cylinders. Furthermore, in some examples, the same set of cylinders may be selected for deactivation each time VDE mode entry conditions are met, while in other examples, the identity of the deactivated cylinders may be varied each time VDE mode entry conditions are met.

Further, it should be understood that the VDE mode entry conditions (defined above at 504) may be repeatedly or continually assessed so that, prior to transitioning to operating in the VDE mode, the cylinder deactivation will not be performed in response to VDE mode entry conditions no longer being met. As an example, if the operating conditions change and the torque demand increases above the threshold torque (defined above at 504) while the solenoid is being warmed via the $DC_{low}$ command signal, method 500 may instead proceed to 506 to maintain operation in the non-VDE mode, with all cylinders active.

At 526, method 500 includes actuating the CDVC solenoid of the selected cylinder(s) to deactivate the corresponding intake and exhaust valves. This includes, at 528, the controller commanding the current driver at a known duty cycle for solenoid actuation (e.g., $DC_{actuation}$, as defined above at 510), such as via a PMW control signal. As one example, a command signal at the known duty cycle for solenoid actuation may be transmitted for a fixed duration, enabling the solenoid actuation to occur, and then discontinued following the actuation. In an example where the CDVC system includes a CPS system, the energization of the solenoid via the input of the control signal to the current driver results in switching to a no-lift cam, as elaborated above with respect to FIG. 3. Thus, the intake and exhaust valves of the selected cylinder(s) may be maintained closed throughout an engine cycle via no-lift cams.

At 530, method 500 includes disabling fuel and spark to the selected cylinders. Fuel flow and spark to the deactivated cylinders may be stopped by deactivating fuel injectors of the selected cylinders (e.g., fuel injector 166 of FIG. 1) and disabling a spark advance signal commanded to the spark plug of each selected cylinder (e.g., spark plug 192 of FIG. 1). Alternatively, the method may not disable the spark advance signal because, even in the presence of spark, the cylinder will not be able to fire without fuel and air. As a result, the deactivated cylinders do not combust air and fuel therein and therefore do not produce torque.

At 532, method 500 includes adjusting engine operating parameters to maintain the torque demand via the remaining cylinders. The remaining (e.g., active) cylinders operate with a higher average cylinder load in the VDE mode (relative to the non-VDE mode) to meet the driver torque demand, increasing pumping efficiency and fuel economy of the engine. For example, one or more of airflow, spark timing, and cylinder valve timing may be adjusted in the remaining, active cylinders in order to maintain the torque demand and minimize torque disturbances during the transition to operating in the VDE mode. Thus, the transition to operating in the VDE mode from the non-VDE mode may be considered to be complete, and the engine may continue to operate in the VDE mode to provide the demanded torque until the operating conditions change to those for operating in the non-VDE mode.

At 534, method 500 includes determining if engine operating conditions have changed to enable exit of the engine from the VDE mode and entry into the non-VDE mode. In one example, non-VDE mode entry conditions (or VDE mode exit conditions) may be met if the torque demand is above the threshold torque defined above at 504.

If the non-VDE mode entry conditions are not met, method 500 proceeds to 536 and includes maintaining engine operation in the VDE mode. Thus, the engine will continue to operate with one or more cylinders deactivated, with combustion occurring in the remaining, active cylinders to meet the torque demand. Else, if the non-VDE mode entry conditions are met, method 500 proceeds to 538 and includes actuating the CDVC solenoid of the selected cylinder(s) to reactivate the corresponding intake and exhaust valves. This includes, at 540, the controller commanding the current driver at the known duty cycle for solenoid actuation so that the energization of the solenoid (or solenoids) results in switching the corresponding intake and exhaust valves to a lift cam, as elaborated above with respect to FIGS. 2 and 3. Thus, the intake and exhaust valves of every engine cylinder, including the cylinder(s) previously selected for deactivation, open and close at predetermined times throughout an engine cycle to enable intake air to be inducted into every cylinder for combustion and exhaust gas from the combustion to be expelled from every cylinder.

At 542, method 500 includes resuming fuel and spark in the selected (e.g., previously deactivated) cylinders. As a result, the reactivated cylinders begin to combust air and fuel therein and thus produce torque. As such, every cylinder of the engine may be provided with fuel and an ignition spark, and combustion may occur in every cylinder of the engine according to a known firing order.

At 544, method 500 includes adjusting engine operating parameters to maintain the torque demand. At this time, since all cylinders are active, each active cylinder may operate with a lower average cylinder load relative to the VDE mode to meet the driver torque demand. In some examples, one or more of airflow, spark timing, and cylinder valve timing may be adjusted in order to minimize torque disturbances during the transition to operating in the non-VDE mode. Following 544, method 500 ends. Thus, the transition to operating in the non-VDE mode from the VDE mode may be considered to be complete, and the engine may continue to operate in the non-VDE mode to provide the demanded torque. Further, method 500 may be repeated so that the engine operating conditions may continue to be assessed, enabling the engine to transition back to operating in the VDE mode in response to the VDE mode entry conditions again being met (e.g., due to operating conditions, such as torque demand, changing).

In this way, a method is provided for monitoring a condition of the CDVC solenoid and enabling a valve transition in response thereto. Further, the method enables the valve transition to be performed more quickly when the solenoid condition does not yet allow actuation by warming the solenoid in the process. As illustrated by examples herein, the method of operating and performing actions responsive to a determination of a solenoid condition may include operating with that condition present (e.g., operating with the engine combusting while the solenoid condition does not allow actuation), determining whether that condition is present (e.g., determining that the solenoid condition does not allow actuation based on a determined impedance, as determined based on a measured current draw by the solenoid) and performing actions in response thereto, as well as operating without that condition present, determining that the condition is not present (e.g., determining that the solenoid condition allows actuation based on the determined impedance), and performing a different action in response thereto. For example, responsive to determining that the solenoid condition does not allow actuation, the method may include operating the solenoid at a lower than threshold duty cycle and not actuating the solenoid; and response to determining that the solenoid condition does allow actuation, the method may include operating the solenoid at or above the threshold duty cycle and actuating the solenoid.

As also illustrated by examples herein, the method may include determining an engine cold start condition and, in response thereto, commanding the solenoid at an initial, lower duty cycle that does not actuate a valve transition; and determining an engine warm condition (which may be conditions that do not include the engine cold start condition) and, in response thereto, commanding the solenoid at a second, higher duty cycle that actuates a valve transition. Further, instructions stored in memory may include determining the engine cold start condition from a temperature sensor coupled to a cooling sleeve of the engine, and in response, determining a current drawn by the solenoid by instructions for sending a signal having the initial, lower duty cycle to a current driver of the solenoid; and determining the engine warm condition from the temperature sensor, and in response, actuating a valve transition by instructions for sending a signal having a higher duty cycle to the current driver, the higher duty cycle at or above a minimum duty cycle for actuating the valve transition.

Next, FIG. 6 shows an example timeline 600 for monitoring and controlling a CDVC system (e.g., CDVC system 200 introduced in FIG. 2) to transition an engine into and out of a VDE mode of operation. For example, in response to desired operation in the VDE mode, a controller (e.g., controller 12 shown in FIGS. 1-4) may determine if a condition of a solenoid of the CDVC system enables actuation to deactivate intake and exhaust valves of selected cylinder(s), such as according to the method of FIGS. 5A-5B, and then perform the actuation when the actuation is enabled. Engine temperature is shown in plot 602, torque demand is shown in plot 604, a CDVC system control signal duty cycle percentage is shown in plot 606, a measured solenoid current consumption is shown in 608, an estimated solenoid current consumption is shown in dashed plot 610, calculated solenoid impedance is shown in plot 612, cylinder valve state is shown in plot 614, and indication of whether additional VDE mode entry conditions are met is shown in plot 616. Note that timeline 600 of FIG. 6 illustrates valve control for a single cylinder (e.g., one CDVC system controlling one set of cylinder intake and exhaust valves), although valve control for other cylinders of the engine may occur simultaneously.

For all of the above, the horizontal axis represents time, with time increasing along the horizontal axis from left to right. The vertical axis represents each labeled parameter. For plots 602, 604, 606, 608, 610, and 612, the labeled parameter increases along the vertical axis from bottom to top. For plot 614, the vertical axis indicates whether the cylinder valves are active or deactivated, as labeled. For plot 616, the vertical axis indicates whether the additional VDE mode entry conditions are met ("yes") or not ("no"). Furthermore, a threshold engine temperature is indicated by dashed line 618, a threshold torque is indicated by dashed line 620, a threshold duty cycle percentage for CDVC system actuation is indicated by dashed line 622, and a threshold solenoid current consumption is indicated by dashed line 624.

At time t0, the engine is started from rest, and the torque demand increases from zero between time t0 and time t1. In the example of FIG. 6, all of the engine cylinders are active when the engine is started, and thus, the cylinder valves are in the active state (plot 614). With the torque demand (plot 604) below the threshold toque demand (dashed line 620), the additional VDE mode entry conditions are met (plot 616). However, with the engine temperature (plot 602) below the threshold temperature (dashed line 618), a cold start condition is present.

Therefore, beginning at time t1, the CDVC system is operated with a first control signal having a low duty cycle percentage (plot 606), much lower than the threshold duty cycle for actuating a valve transition (dashed line 622). While the CDVC system is operated with the first control signal, the solenoid current consumption is measured (plot 608) and used to calculate the solenoid impedance (plot 612). In the example of FIG. 6, the first control signal is held at the low duty cycle percentage while the current consumption is measured and the solenoid impedance is calculated. However, in other examples, the duty cycle may be continuously updated in real-time or near real-time based on the measured current consumption and the calculated solenoid impedance. The solenoid impedance (plot 612) is in turn used to estimate the expected solenoid current consumption (dashed plot 610) that would occur if the CDVC system were instead operated at the threshold duty cycle percentage for actuating a valve transition (dashed line 622). Prior to time t2, the estimated expected solenoid current consumption (dashed plot 610) is greater than the threshold current (dashed line 624), indicating that the solenoid would draw more current than a capability of an associated current driver. As a result, the valve transition is not actuated, and the cylinder valves remain active (plot 614) despite the additional VDE mode entry conditions being met (plot 616).

Instead, the low duty cycle percentage is adjusted to a higher duty cycle that remains below the threshold duty cycle percentage, and at time t2, the CDVC system is operated with a second control signal having the adjusted low duty cycle percentage (plot 606). While the CDVC system is operated with the second control signal, the solenoid current consumption is again measured (plot 608) and used to update the solenoid impedance (plot 612). A temperature of the solenoid increases as it is operated with both the first control signal and the second control signal. Therefore, the updated solenoid impedance determined between time t2 and time t3 is greater than the initial solenoid impedance determined between time t1 and time t2. The updated solenoid impedance (plot 612) is used to re-estimate the expected solenoid current consumption (dashed plot 610) at the threshold duty cycle percentage (dashed line 622). The resulting expecting current consumption (dashed plot 610) is less than the threshold current (dashed line 624) between time t2 and time t3, and so over-current on the current driver is not expected during actuation.

Therefore, at time t3, the CDVC system is operated with a third control signal having a duty cycle percentage equal to the threshold duty cycle percentage (plot 606) to actuate the valve transition. As a result, a short time after time t3 (accounting for delays in propagating the control signal to the mechanical components for actuating the valve transition), the cylinder is switched to a deactivated state, and the engine is transitioned to the VDE mode of operation. As described above with respect to FIGS. 5A-5B, transitioning to the VDE mode of operation may also include deactivating one or more cylinders in a determined pattern, disabling fuel and spark to the one or more cylinders, and adjusting operating parameters in the remaining active cylinders in order to meet the torque demand shown in plot 604.

Due to the CDVC system being operated with the first control signal and the second control signal, each having a low duty cycle percentage (e.g., lower than the duty cycle percentage threshold) to increase the temperature of the solenoid without actuating the solenoid, the valve deactivation is initiated at time t3, which is a duration d1 after the engine start. In comparison, if the CDVC were not commanded with the low duty cycle percentage control signals prior to the control signal for actuation, the valve deactivation may instead be initiated at time t4, for example, when the engine temperature (plot 602) reaches the threshold temperature (dashed line 618) and the engine (and thus the CDVC solenoid) is considered warm. Time t4 is a duration d2 after the engine start, which is longer than the duration d1. Thus, warming the CDVC solenoid with the less than threshold duty cycle percentages enables the transition to the VDE mode of engine operation to occur sooner, resulting in additional fuel savings and increased engine efficiency.

At time t5, the torque demand (plot 604) increases, such as due to a driver tip-in, and increases above the torque threshold (dashed line 620). As a result, the additional VDE mode entry conditions are no longer met (plot 616), and a transition back to the non-VDE mode of engine operation is desired in order to meet the higher than threshold torque demand. The engine is warm, with the engine temperature (plot 602) above the threshold temperature (dashed plot 618). Therefore, the CDVC system is actuated with a control signal having a duty cycle percentage (plot 606) that is greater than the threshold duty cycle percentage (dashed line 622), and as a result, the cylinder valves are switched to an active state shortly after the control signal is issued (plot 614). As described above with respect to FIGS. 5A-5B, transitioning out of the VDE mode of operation may also include enabling fuel and spark to the previously deactivated cylinders and adjusting operating parameters in the cylinders that remained active during the VDE mode in order to meet the torque demand shown in plot 604. Thus, in contrast to time t1, the warm solenoid condition, inferred from the warm engine condition, enables the valves to be re-activated without first determining the solenoid impedance at the lower than threshold duty cycle percentage, as over-current is not expected.

At time t6, the torque demand (plot 604) decreases, such as due to a driver tip-out, and decreases below the torque threshold (dashed line 620). As a result, the additional VDE mode entry conditions are met (plot 616), and a transition back to the VDE mode of engine operation is desired in order to increase engine and fuel efficiency. Because the engine is not in a cold start condition and the CDVC solenoid is warm, the CDVC system is again actuated with a control signal having a duty cycle percentage (plot 606) that is greater than the threshold duty cycle percentage (dashed line 622) to switch the cylinder valves to the deactivated state (plot 614). Thus, once the solenoid is determined to be warm, the solenoid impedance may be inferred to be high enough that over-current with not occur, and the cylinder valves may be transitioned between the active and deactivated states via the CDVC system as the engine torque demand changes.

In this way, a measurement of a CDVC solenoid condition (e.g., current consumption, which is inversely proportional to impedance) is provided, enabling faster CDVC solenoid actuation after an engine start without risking over-current on an associated current driver. As a result, the engine may be switched to a VDE mode of operation sooner for increased engine and fuel efficiency. Additionally, because the CDVC solenoid draws current in order for the current consumption to be measured, the solenoid temperature is increased while the solenoid condition is determined, further decreasing an amount of time until the solenoid can be actuated for a valve transition. Further still, because the solenoid impedance is determined from a direct measurement of the current consumption, the risk of over-current on the current driver is mitigated, thereby decreasing an occurrence of CDVC system degradation.

The technical effect of operating a cylinder deactivation valve control solenoid at a duty cycle that is less than a threshold duty cycle for actuating the solenoid is that an impedance of the solenoid can be determined while a temperature of the solenoid is increased.

As one example, a method comprises: while operating an engine in a first condition, sending a lower command signal to a cylinder deactivation valve control (CDVC) system without actuating a cylinder valve transition; determining an impedance of a solenoid of the CDVC system while sending the lower command signal; and actuating the cylinder valve transition responsive to the determined impedance by sending a higher command signal to the CDVC system. In the preceding example, the method may additionally or optionally further comprise, while operating the engine in a second condition, actuating the cylinder valve transition by sending the higher command signal to the CDVC system without first sending the lower command signal to the CDVC system. In one or both of the preceding examples, additionally or optionally, the first condition includes a temperature of the engine being less than a threshold temperature, and the second condition includes the temperature of the engine being greater than or equal to the threshold temperature. In any or all of the preceding examples, additionally or optionally, the cylinder valve transition includes a cylinder valve deactivation, and the actuating the cylinder valve transition is further responsive to an engine torque demand being less than a threshold torque demand. In any or all of the preceding examples, additionally or optionally, determining the impedance of the solenoid is based on a current consumed by the solenoid while sending the lower command signal and an average voltage supplied to the CDVC system while sending the lower command signal. In any or all of the preceding examples, additionally or optionally, the current consumed by the solenoid while sending the lower command signal is determined via a current sensing circuit. In any or all of the preceding examples, additionally or optionally, actuating the cylinder valve transition responsive to the determined impedance comprises: estimating an expected current consumption by the solenoid at the higher command signal based on the determined impedance; sending the higher command signal to the CDVC system responsive to the expected current draw being less than or equal to a threshold current; and not sending the higher command signal to the CDVC system responsive to the expected current draw being greater than the threshold current. In any or all of the preceding examples, the method additionally or optionally further comprises, further responsive to the expected current draw being greater than the threshold current, updating the lower command signal based on the determined impedance; sending the updated lower command signal to the CDVC system without actuating the cylinder valve transition; determining an updated impedance of the solenoid while sending the updated lower command signal; and actuating the cylinder valve transition responsive to the updated impedance. In any or all of the preceding examples, additionally or optionally, the lower command signal includes a first pulse-width modulation signal with a first duty cycle that is less than a threshold duty cycle for actuating the solenoid, and the higher command signal includes a second pulse-width modulation signal with a second duty cycle that is greater than the threshold duty cycle for actuating the solenoid.

As another example, a method for an engine comprises: during a first condition, applying a first duty cycle to a cylinder deactivation valve control (CDVC) current driver, the first duty cycle less than a threshold duty cycle for actuating an associated solenoid, and determining current consumption by the solenoid; and during a second condition, actuating the solenoid by applying a second duty cycle to the CDVC current driver, the second duty cycle greater than or equal to the threshold duty cycle. In the preceding example, additionally or optionally, the first condition includes an engine temperature less than a threshold temperature, and the second condition includes the engine temperature greater than or equal to the threshold temperature. In one or both of the preceding examples, additionally or optionally, the first condition includes an expected current consumption by the solenoid while applying the second duty cycle to the CDVC current driver estimated to be greater than a threshold current, and the second condition includes the expected current consumption by the solenoid while applying the second duty cycle to the CDVC current driver estimated to be less than or equal to the threshold current. In any or all of the preceding examples, the method additionally or optionally further comprises, during the first condition, calculating an impedance of the solenoid based on the determined current consumption; estimating an expected current consumption by the solenoid at the second duty cycle based on the calculated impedance; actuating the solenoid by applying the second duty cycle to the CDVC current driver in response to the expected current consumption being less than or equal to a threshold current; and adjusting the first duty cycle in response to the expected current consumption being greater than the threshold current. In any or all of the preceding examples, additionally or optionally, adjusting the first duty cycle includes increasing the first duty cycle while remaining below the threshold duty cycle, a degree of the increasing based in part on the calculated impedance. In any or all of the preceding examples, the method additionally or optionally further comprises applying the adjusted first duty cycle to the CDVC current driver; determining an updated current consumption by the solenoid while applying the adjusted first duty cycle; calculating an updated impedance of the solenoid based on the determined updated current consumption; estimating an updated expected current consumption by the solenoid at the second duty cycle based on the calculated updated impedance; actuating the solenoid by applying the second duty cycle to the CDVC current driver in response to the updated expected current consumption being less than or equal to the threshold current; and further adjusting the first duty cycle in response to the updated expected current consumption being greater than the threshold current.

As another example, a system comprises: an engine cylinder including an intake valve and an exhaust valve; a valve deactivation mechanism coupled to the intake valve and the exhaust valve, the valve deactivation mechanism including an electromechanical actuator configured to transition the intake valve and the exhaust valve between an active state and a deactivated state; and a controller storing executable instructions on non-transitory memory that, when executed, cause the controller to: command the electromechanical actuator at an initial duty cycle that does not trigger a valve transition while learning an impedance of the electromechanical actuator; and after learning the impedance, command the electromechanical actuator at an updated duty cycle based on the learned impedance while maintaining a current consumption of the electromechanical actuator below a threshold current. In the preceding example, additionally or optionally, the valve deactivation mechanism includes a current sensing circuit, and wherein to learn the impedance of the electromechanical actuator, the controller stores further instructions on non-transitory memory that, when executed, cause the controller to: measure the current consumption of the electromechanical actuator via the current sensing circuit while commanding the electromechanical actuator at the initial duty cycle; and determine the impedance based on the measured current consumption and a supply voltage. In one or both of the preceding examples, additionally or optionally, the instructions to command the electromechanical actuator at the initial duty cycle that does not trigger the valve transition while learning the impedance of the electromechanical actuator are executed responsive to an engine temperature less than a threshold temperature. In any or all of the preceding examples, additionally or optionally, to command the electromechanical actuator at the updated duty cycle based on the learned impedance while maintaining the current consumption of the electromechanical actuator below the threshold current, the controller stores further instructions on non-transitory memory that, when executed, cause the controller to: determine an expected current consumption of the electromechanical actuator if commanded at a minimum duty cycle for triggering the valve transition; in response to the expected current consumption being less than the threshold current, set the updated duty cycle to the minimum duty cycle for triggering the valve transition; and in response to the expected current consumption being greater than the threshold current, set the updated duty cycle to be greater than the initial duty cycle and less than the minimum duty cycle for triggering the valve transition. In any or all of the preceding examples, additionally or optionally, the controller stores further instructions on non-transitory memory that, when executed, cause the controller to: responsive to the engine temperature being greater than the threshold temperature, command the electromechanical actuator at or above the minimum duty cycle for triggering the valve transition.

In another representation, a method for an engine comprises: applying a command signal to a cylinder deactivation valve control (CDVC) current driver to learn an impedance of an associated solenoid, the command signal having a duty cycle that is less than a threshold duty cycle for actuating the solenoid; and continuously adjusting the command signal based on the learned impedance. In the preceding example, additionally or optionally, to learn the impedance includes measuring a current consumption by the solenoid while applying the command signal; and calculating the impedance based on the measured current consumption, the duty cycle of the command signal, and a supply voltage. In one or both of the preceding examples, additionally or optionally, continuously adjusting the command signal based on the learned impedance includes increasing the duty cycle as the learned impedance increases while remaining below the threshold duty cycle. In any or all of the preceding examples, additionally or optionally, continuously adjusting the command signal based on the learned impedance further includes calculating an updated duty cycle that will achieve a desired current consumption by the solenoid, and adjusting the command signal to the updated duty cycle. In any or all of the preceding examples, the method additionally or optionally further comprises updating the learned impedance based on the updated duty cycle; and further updating the duty cycle based on the updated learned impedance. In any or all of the preceding examples, the method additionally or optionally further comprises determining an expected current consumption by the solenoid at the threshold duty cycle based on the learned impedance; and in response to the expected current consumption being less than or equal to a threshold current consumption, actuating the solenoid by applying the command signal at the threshold duty cycle. In any or all of the preceding examples, additionally or optionally, actuating the solenoid is further in response to a request for a valve state transition. In any or all of the preceding examples, additionally or optionally, the request for the valve state transition is responsive to transitioning into a variable displacement engine mode of engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, 1-4, 1-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   while operating an engine in a first condition,
      sending a lower command signal to a cylinder deactivation valve control (CDVC) system without actuating a cylinder valve transition;
      determining an impedance of a solenoid of the CDVC system while sending the lower command signal; and
      actuating the cylinder valve transition responsive to the determined impedance by sending a higher command signal to the CDVC system.

2. The method of claim 1, further comprising:
   while operating the engine in a second condition, actuating the cylinder valve transition by sending the higher command signal to the CDVC system without first sending the lower command signal to the CDVC system.

3. The method of claim 2, wherein the first condition includes a temperature of the engine being less than a threshold temperature, and wherein the second condition includes the temperature of the engine being greater than or equal to the threshold temperature.

4. The method of claim 2, wherein the cylinder valve transition includes a cylinder valve deactivation, and the actuating of the cylinder valve transition is further responsive to an engine torque demand being less than a threshold torque demand.

5. The method of claim 1, wherein the determining of the impedance of the solenoid is based on a current consumed by the solenoid while sending the lower command signal and an average voltage supplied to the CDVC system while sending the lower command signal.

6. The method of claim 5, wherein the current consumed by the solenoid while sending the lower command signal is determined via a current sensing circuit.

7. The method of claim 1, wherein the actuating of the cylinder valve transition responsive to the determined impedance comprises:
   estimating an expected current consumption by the solenoid at the higher command signal based on the determined impedance; and
   sending the higher command signal to the CDVC system responsive to the expected current consumption being less than or equal to a threshold current.

8. The method of claim 7, comprising:
   updating the lower command signal based on the determined impedance responsive to the expected current consumption being greater than the threshold current;
   sending the updated lower command signal to the CDVC system without actuating the cylinder valve transition;
   determining an updated impedance of the solenoid while sending the updated lower command signal; and
   actuating the cylinder valve transition responsive to the updated impedance.

9. The method of claim 1, wherein the lower command signal includes a first pulse-width modulation signal with a first duty cycle that is less than a threshold duty cycle for actuating the solenoid, and the higher command signal includes a second pulse-width modulation signal with a second duty cycle that is greater than the threshold duty cycle for actuating the solenoid.

10. A method for an engine, comprising:
   during a first condition, applying a first duty cycle to a cylinder deactivation valve control (CDVC) current driver, the first duty cycle less than a threshold duty cycle for actuating an associated solenoid, and determining current consumption by the solenoid; and
   during a second condition, actuating the solenoid by applying a second duty cycle to the CDVC current driver, the second duty cycle greater than or equal to the threshold duty cycle.

11. The method of claim 10, wherein the first condition includes an engine temperature being less than a threshold temperature, and wherein the second condition includes the engine temperature being greater than or equal to the threshold temperature.

12. The method of claim 10, wherein the first condition includes an expected current consumption by the solenoid when applying the second duty cycle to the CDVC current driver being estimated to be greater than a threshold current, and wherein the second condition includes the expected current consumption being estimated to be less than or equal to the threshold current.

13. The method of claim 10, further comprising:
   during the first condition,
      calculating an impedance of the solenoid based on the determined current consumption;
      estimating an expected current consumption by the solenoid at the second duty cycle based on the calculated impedance;
      actuating the solenoid by applying the second duty cycle to the CDVC current driver in response to the expected current consumption being less than or equal to a threshold current; and
      adjusting the first duty cycle in response to the expected current consumption being greater than the threshold current.

14. The method of claim 13, wherein the adjusting of the first duty cycle includes increasing the first duty cycle while remaining below the threshold duty cycle, a degree of the increasing based in part on the calculated impedance.

15. The method of claim 14, further comprising:
applying the adjusted first duty cycle to the CDVC current driver;
determining an updated current consumption by the solenoid while applying the adjusted first duty cycle;
calculating an updated impedance of the solenoid based on the determined updated current consumption;
estimating an updated expected current consumption by the solenoid at the second duty cycle based on the calculated updated impedance;
applying the second duty cycle to the CDVC current driver in response to the updated expected current consumption being less than or equal to the threshold current; and
further adjusting the first duty cycle in response to the updated expected current consumption being greater than the threshold current.

16. A system, comprising:
an engine cylinder including an intake valve and an exhaust valve;
a valve deactivation mechanism coupled to the intake valve and the exhaust valve, the valve deactivation mechanism including an electromechanical actuator configured to transition the intake valve and the exhaust valve between an active state and a deactivated state; and
a controller storing executable instructions on non-transitory memory that, when executed, cause the controller to:
command the electromechanical actuator at an initial duty cycle that does not trigger a valve transition while learning an impedance of the electromechanical actuator; and
command the electromechanical actuator at an updated duty cycle based on the learned impedance while maintaining a current consumption of the electromechanical actuator below a threshold current.

17. The system of claim 16, wherein the valve deactivation mechanism includes a current sensing circuit, and wherein the learning of the impedance of the electromechanical actuator includes:
measuring the current consumption of the electromechanical actuator via the current sensing circuit while commanding the electromechanical actuator at the initial duty cycle; and
determining the impedance based on the measured current consumption and a supply voltage.

18. The system of claim 16, wherein the commanding of the electromechanical actuator at the initial duty cycle is responsive to an engine temperature being less than a threshold temperature.

19. The system of claim 18, wherein the commanding of the electromechanical actuator at the updated duty cycle further includes:
determining an expected current consumption of the electromechanical actuator when commanded at a minimum duty cycle for triggering the valve transition;
setting the updated duty cycle to the minimum duty cycle for triggering the valve transition in response to the expected current consumption being less than the threshold current; and
setting the updated duty cycle to be greater than the initial duty cycle and less than the minimum duty cycle for triggering the valve transition in response to the expected current consumption being greater than the threshold current.

20. The system of claim 19, wherein the controller stores further instructions on non-transitory memory that, when executed, cause the controller to:
command the electromechanical actuator at or above the minimum duty cycle for triggering the valve transition responsive to the engine temperature being greater than the threshold temperature.

* * * * *